Oct. 16, 1956 W. J. HAMMERS 2,766,714
EXHAUST FUME ELIMINATOR
Filed Sept. 3, 1953
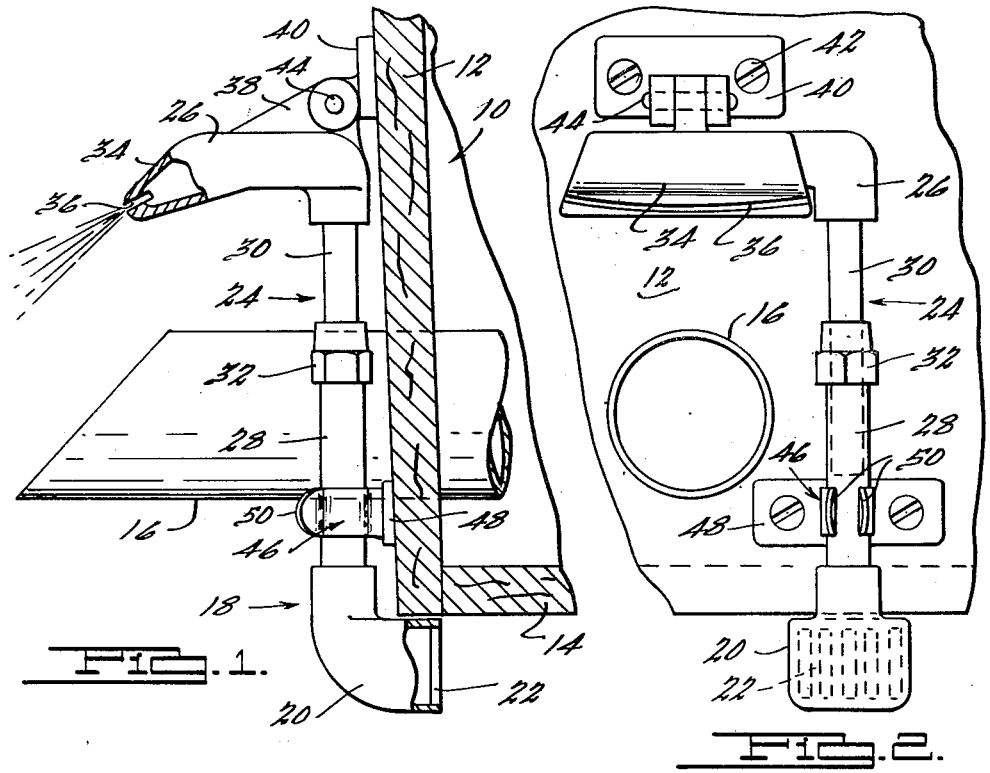
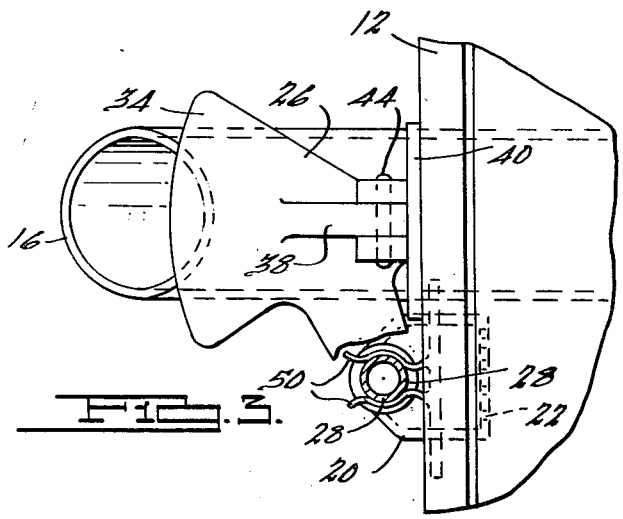
INVENTOR.
William J. Hammers
BY
E. J. Balluff
ATTORNEY.

United States Patent Office 2,766,714
Patented Oct. 16, 1956

2,766,714

EXHAUST FUME ELIMINATOR

William J. Hammers, Detroit, Mich.

Application September 3, 1953, Serial No. 378,230

1 Claim. (Cl. 115—.5)

This invention relates to the treatment of exhaust gases of an internal combustion engine and has particular reference to a device for use with a boat powered by an internal combustion engine for eliminating or substantially reducing the objectionable fumes issuing from the exhaust pipe of the boat.

Power boats, particularly speed boats and other pleasure craft, customarily have an exhaust pipe for conducting exhaust gases from the engine extending through the hull of the boat, generally at the rear, and adapted to discharge such gases at the rear of the boat above the water line. These exhaust gases have an objectionable odor, are harmful in large quantities, and carry particles of carbon and other matter. Such gases will drift into the boat to cause annoyance and discomfort to the passengers, and it is an object of the present invention to eliminate such fumes. These exhaust gases will rise and drift into the boat even though the boat is moving at a fairly high speed due to the partial vacuum created at the rear of the boat as the boat moves through the water.

Previous attempts have been made to eliminate exhaust gases from power boats by attempting to mix the same with water within the exhaust pipe and discharging a mixture of water and exhaust gases from the exhaust pipe. These attempts have not proven satisfactory, however, since all of the exhaust gases are not mixed with the water and issue from the exhaust pipe without having the objectionable material removed therefrom.

The present invention contemplates treating such exhaust gases by spraying water directly downwardly onto the gases as they issue from the exhaust pipe so as to drive such gases and the particles entrained therein into the water. To this end I provide a fixture which can be readily attached to the exterior of the boat and which has a scoop portion positioned below the water line for taking in water as the boat moves through the water and a spray head positioned directly above the end of the exhaust pipe for spraying water directly downwardly onto the exhaust gases.

A principal object of the invention, therefore, is to provide a new and improved device for eliminating exhaust fumes from power boats.

A further object of the invention is to provide an exhaust fume eliminator for boats which is readily attached to the exterior of the boat and which is made to fit existing boats of varying sizes and construction.

Other and further objects of the invention will be apparent from the following description and claim and may be understood by reference to the accompanying drawings, of which there is one sheet, which by way of illustration show a preferred embodiment of the invention and what I now consider to be the best mode in which I have contemplated applying the principles of my invention. Other embodiments of the invention may be used without departing from the scope of the present invention as set forth in the appended claim.

In the drawings:

Fig. 1 is a side elevational view, partly in section, of my exhaust fume eliminator, showing the same attached to the stern of a boat;

Fig. 2 is a rear elevational view of the device of Fig. 1; and

Fig. 3 is a top plan view of the fixture.

Referring more particularly to the drawings, the numeral 10 designates the hull of a boat having a rear wall 12 and a bottom 14. An exhaust pipe 16 extends through the rear wall 12 of the hull above the water line and conducts exhaust gases from the internal combustion engine (not shown) which powers the boat.

The exhaust fume eliminator of this invention comprises a fixture indicated generally at 18 adapted to be attached to the exterior of the hull of the boat and to pick up water as the boat moves through the water and to discharge a spray of water downwardly onto the exhaust gases issuing from the pipe 16. The fixture 18 comprises a scoop 20 having a suitable grille or screen 22 to prevent clogging of the fixture, an extensible conduit portion 24, and a spray head 26. The conduit portion may comprise telescoping pipes 28 and 30 suitably secured together by a coupling member 32. The pipes 28 and 30 may be adjusted to provide the proper height for the spray head 26 relative to the exhaust pipe 16 so that the fixture is suitable for use in boats of varying sizes and construction.

The spray head 26 comprises a relatively wide, flat nozzle portion 34 having a slot 36 therein which provides the discharge outlet through which water taken in by the scoop 20 is sprayed out over the exhaust gases. The nozzle 34 and the slot 36 are designed to discharge the water taken in by the scoop 20 in the form of a relatively wide spray adapted to completely cover and blanket the gases issuing from pipe 16 so as to condense the gases and drive the same and any particles entrained therein into the water.

The spray head 26 is provided with a boss 38, and a bracket 40 secured to the exterior of the boat by means such as screws 42 is adapted to pivotally support the fixture 18 by means of a pin 44 hingedly connecting the bracket 40 and boss 38. The hinged connection provides the sole means by which the fixture is permanently secured to the boat so that the fixture is free to pivot on pin 44 away from the boat in the event the scoop 20 should strike an obstruction, thus preventing damage to the fixture or to the boat. The lower end of the fixture is releasably retained in the position shown with the scoop positioned below the bottom of the boat by means of a spring clamp 46 having a base 48 suitably secured to the boat and spring arms 50 engaging the lower pipe section 28.

It will be seen that I have provided an exhaust fume eliminator which is very simple in construction and which is attached only to the exterior of the boat, and which will fit boats of varying sizes and construction.

While I have illustrated and described a preferred embodiment of my invention, it is understood that this is capable of modification, and I therefore do not wish to be limited to the precise details set forth but desire to avail myself of such changes and alterations as fall within the purview of the following claim.

I claim:

An exhaust fume eliminator for a boat having an internal combustion engine and an exhaust pipe therefor terminating outside the boat above the water line, comprising a fixture having a water inlet at its lower end positioned below the water line, a spray head, and a water conduit connecting said inlet and spray head, said spray head having a horizontally disposed downwardly directed slot forming the outlet therefrom disposed above the outlet end of the exhaust pipe for discharging a relatively wide spray of water downwardly onto the exhaust gases so as to drive the exhaust gases and particles entrained therein into the water, a bracket secured to the exterior of the boat and pivotally supporting the upper end of said fixture for pivotal movement of said fixture on a horizontal axis transverse to the forward motion of the boat, and a second bracket secured to the exterior of the boat and releasably engaging said conduit below said pivotal connection for yieldably resisting pivoting of said fixture on said first bracket.

References Cited in the file of this patent

UNITED STATES PATENTS

| | | |
|---|---|---|
| 204,739 | Johnson | June 11, 1878 |
| 576,432 | Bush | Feb. 2, 1897 |
| 1,054,301 | Mathis | Feb. 25, 1913 |
| 2,389,059 | Kurth | Nov. 13, 1943 |
| 2,551,497 | Lee | May 1, 1951 |
| 2,565,885 | Reitz | Aug. 28, 1951 |

OTHER REFERENCES

Published Illustration of a Towing Spar Buoy, upper left corner page 8, Sunday Star, Washington, D. C., January 5, 1941.